US009249292B2

(12) United States Patent
Hamakura et al.

(10) Patent No.: US 9,249,292 B2
(45) Date of Patent: Feb. 2, 2016

(54) COMPOSITION FOR INJECTION MOLDING, SINTERED COMPACT, AND METHOD FOR PRODUCING SINTERED COMPACT

(71) Applicant: Seiko Epson Corporation, Tokyo (JP)

(72) Inventors: Nobuyuki Hamakura, Yuzawa (JP); Hidefumi Nakamura, Hachinohe (JP)

(73) Assignee: Seiko Epson Corporation (JP)

(*) Notice: Subject to any disclaimer, the term of this patent is extended or adjusted under 35 U.S.C. 154(b) by 524 days.

(21) Appl. No.: 13/688,855

(22) Filed: Nov. 29, 2012

(65) Prior Publication Data

US 2015/0376397 A1 Dec. 31, 2015

(30) Foreign Application Priority Data

Nov. 30, 2011 (JP) ................................ 2011-262956

(51) Int. Cl.
*C09B 67/00* (2006.01)
*C22C 29/00* (2006.01)
*C08L 59/00* (2006.01)

(52) U.S. Cl.
CPC .................................... *C08L 59/00* (2013.01)

(58) Field of Classification Search
USPC ........................................................ 524/502
See application file for complete search history.

(56) References Cited

U.S. PATENT DOCUMENTS

| | | | |
|---|---|---|---|
| 5,362,791 | A | 11/1994 | Ebenhoech et al. |
| 5,695,697 | A | 12/1997 | Trubenbach et al. |
| 6,051,184 | A | 4/2000 | Kankawa |
| 7,811,512 | B2 | 10/2010 | Sakata et al. |
| 7,993,576 | B2 | 8/2011 | Sakata et al. |
| 2002/0176979 | A1 | 11/2002 | Evans |
| 2008/0227906 | A1 | 9/2008 | Sakata et al. |
| 2011/0314964 | A1 | 12/2011 | Ishigami et al. |
| 2013/0133481 | A1 | 5/2013 | Hamakura et al. |

FOREIGN PATENT DOCUMENTS

| | | | |
|---|---|---|---|
| EP | 0 561 343 | A1 | 9/1993 |
| EP | 2 343 441 | A1 | 7/2011 |
| EP | 2 409 797 | A1 | 1/2012 |
| EP | 2409797 | A1 * | 1/2012 |
| JP | 09-111305 | A | 4/1997 |
| JP | 11-131103 | | 5/1999 |
| JP | 11-310803 | A | 11/1999 |
| JP | 2002-030305 | A | 1/2002 |
| JP | 2004-232055 | A | 8/2004 |
| JP | 2006-257485 | A | 9/2006 |
| JP | 2008-075153 | | 4/2008 |
| JP | 2008-075154 | | 4/2008 |
| JP | 2008-222535 | | 9/2008 |
| JP | 2008-223127 | | 9/2008 |
| JP | 2012-007212 | | 1/2012 |
| JP | 2012-007223 | | 1/2012 |
| WO | WO-2010-106949 | A1 | 9/2010 |

OTHER PUBLICATIONS

Extended European Search Report for Application No. EP 12 19 4386 mailed May 27, 2013 (6 pages).

* cited by examiner

*Primary Examiner* — Hui Chin
(74) *Attorney, Agent, or Firm* — Harness, Dickey & Pierce, P.L.C.

(57) ABSTRACT

A composition for injection molding includes: an inorganic powder composed of at least one of a metal material and a ceramic material; and a binder containing a polyacetal-based resin and an ethylene-glycidyl methacrylate-based copolymer. In the composition, the ethylene-glycidyl methacrylate-based copolymer is contained in an amount of 1% by mass or more and 30% by mass or less with respect to the amount of the polyacetal-based resin.

19 Claims, 2 Drawing Sheets

COMPOSITION FOR INJECTION MOLDING, SINTERED COMPACT, AND METHOD FOR PRODUCING SINTERED COMPACT

BACKGROUND

1. Technical Field

The present invention relates to a composition for injection molding, a sintered compact, and a method for producing a sintered compact.

2. Related Art

A powder metallurgy process for producing a metal product by sintering a molded body containing a metal powder has been widely used in many industrial fields recently because a near net shape sintered compact can be obtained using the process. Further, a ceramic powder can be used in place of a metal powder. There are many methods for producing a molded body (molding methods), however, a powder injection molding method in which an inorganic powder and an organic binder are mixed and kneaded, and injection molding is performed using the resulting kneaded material (compound) is known. A molded body produced by such a powder injection molding method is then subjected to a degreasing treatment to remove the organic binder, followed by firing, whereby a metal product or a ceramic product in a desired shape is obtained.

In such a powder injection molding method, it is necessary to select an appropriate organic binder according to various purposes, for example, for the purpose of imparting shape retainability to the molded body.

For example, JP-A-2008-75153 discloses, as an organic binder to be used in a powder injection molding method, a polyacetal resin, a polystyrene, a polyolefin, a higher fatty acid, and the like.

However, in the case of molding into a complicated shape, unless the shape retainability of the molded body is sufficiently high when degreasing, it is difficult to maintain the shape of the molded body when degreasing and sintering as it is immediately after molding, and therefore, deformation, chipping, or the like occurs which deteriorates the dimensional accuracy of a sintered compact. Due to this, it is desirable to further increase the shape retainability when degreasing.

SUMMARY

An advantage of some aspects of the invention is to provide a composition for injection molding capable of producing a molded body having high shape retainability when degreasing, and also capable of producing a sintered compact which is less deformed, chipped, or the like and which has high quality, a sintered compact having high dimensional accuracy produced using such a composition for injection molding, and a method for producing a sintered compact capable of efficiently producing such a sintered compact.

An aspect of the invention is directed to a composition for injection molding including an inorganic powder composed of at least one of a metal material and a ceramic material and a binder containing a polyacetal-based resin and an ethylene-glycidyl methacrylate-based copolymer, wherein the ethylene-glycidyl methacrylate-based copolymer is contained in an amount of 1% by mass or more and 30% by mass or less with respect to the amount of the polyacetal-based resin.

According to this configuration, a composition for injection molding capable of producing a molded body having high shape retainability when degreasing is obtained. As a result, a composition for injection molding capable of producing a sintered compact which is less deformed, chipped, or the like and which has high quality is obtained.

It is preferred that the composition has an inner layer, which is composed mainly of the ethylene-glycidyl methacrylate-based copolymer and is provided so as to cover the surface of each particle of the inorganic powder, and an outer layer, which is composed mainly of the polyacetal-based resin and is located outside the inner layer.

According to this configuration, the shape retainability and the moldability can both be achieved.

It is preferred that the polyacetal-based resin is a copolymer of formaldehyde and a comonomer other than formaldehyde. According to this configuration, the shape retainability can be further enhanced.

It is preferred that the ethylene-glycidyl methacrylate-based copolymer contains at least one of vinyl acetate and methyl acrylate as a monomer constituting the copolymer.

According to this configuration, monomers that more reliably bind inorganic powder particles to one another are used, and therefore, the shape retainability can be particularly enhanced.

It is preferred that the softening point of the ethylene-glycidyl methacrylate-based copolymer is 65° C. or higher and 105° C. or lower.

According to this configuration, the shape retainability and the moldability can both be enhanced.

It is preferred that the composition for injection molding includes a saturated fatty acid.

According to this configuration, the saturated fatty acid functions as a lubricant, and the moldability of the composition for injection molding can be further enhanced. It is preferred that the composition for injection molding includes a wax.

According to this configuration, the fluidity of the composition for injection molding is increased, and the moldability is further enhanced. Further, when degreasing, the ethylene-glycidyl methacrylate-based copolymer is decomposed in a lower temperature range than the polyacetal-based resin, and therefore, as the temperature is raised, the ethylene-glycidyl methacrylate-based copolymer and the polyacetal-based resin are sequentially discharged, and as a result, the shape retainability of the molded body when degreasing can be further enhanced.

Another aspect of the invention is directed to a sintered compact which is produced using the composition for injection molding according to the aspect of the invention described above.

According to this configuration, a sintered compact having high dimensional accuracy is obtained.

Still another aspect of the invention is directed to a method for producing a sintered compact, including: kneading an inorganic powder composed of at least one of a metal material and a ceramic material and a binder containing a polyacetal-based resin and an ethylene-glycidyl methacrylate-based copolymer at a temperature between the softening point of the polyacetal-based resin and a temperature 10° C. lower than the softening point of the polyacetal-based resin to obtain a kneaded material; molding the kneaded material to obtain a molded body; and degreasing the molded body, followed by firing, to obtain a sintered compact. According to this configuration, a sintered compact having high dimensional accuracy can be efficiently produced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
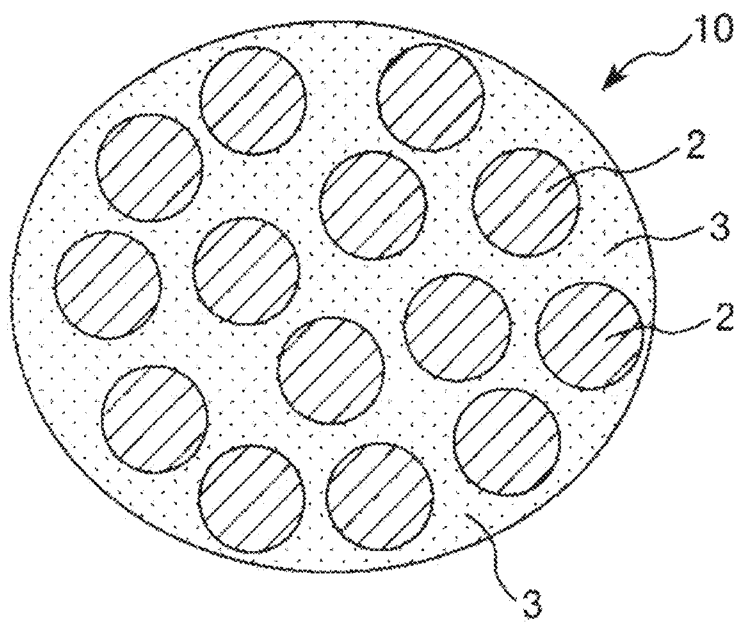
FIG. 1 is a cross-sectional view schematically showing a structure of a composition for injection molding according to an embodiment of the invention.

Hereinafter, a composition for injection molding, a sintered compact, and a method for producing a sintered compact according to an embodiment of the invention will be more specifically described.

Composition for Injection Molding

The composition for injection molding of the embodiment of the invention includes an inorganic powder and a binder and is obtained by kneading these components.

The inorganic powder is composed of at least one of a metal material and a ceramic material.

The binder is a component for binding inorganic powder particles to one another, and contains a polyacetal-based resin as a component A and an ethylene-glycidyl methacrylate-based copolymer as a component B.

By the injection molding of such a composition for injection molding, a molded body which has high shape retainability when degreasing is obtained. Therefore, by firing this molded body, a sintered compact which is less deformed, chipped, or the like and which has high quality is obtained.

Hereinafter, the respective components of the composition for injection molding of the embodiment of the invention will be described in detail.

Inorganic Powder

As the inorganic powder, as described above, a powder composed of at least one of a metal material and a ceramic material is used. Specifically, other than a metal powder and a ceramic powder, a powder of a composite material of a metal material and a ceramic material, and a mixed powder of a metal powder and a ceramic powder can be exemplified.

Examples of the metal material include Mg, Al, Ti, V, Cr, Mn, Fe, Co, Ni, Cu, Zn, Y, Zr, Nb, Mo, Pd, Ag, In, Sn, Ta, W, an alloy of some of these metallic elements, and an alloy of any of these metallic elements with another metallic element, and among these metal materials, one metal material or a mixture of two or more metal materials may be used.

Among these metal materials, particularly, a stainless steel, a die steel, a high-speed tool steel, a low-carbon steel, any of a variety of Fe-based alloys such as an Fe—Ni-based alloy, an Fe—Si-based alloy, an Fe—Co-based alloy, and an Fe—Ni—Co-based alloy, an Al-based alloy, a Ti-based alloy, or the like is preferably used. Such a metal material has excellent mechanical properties, and therefore, a sintered compact which has excellent mechanical properties and can be used in a wide range of applications is obtained.

Examples of the stainless steel include SUS304, SUS316, SUS317, SUS329, SUS410, SUS430, SUS440, and SUS630.

Examples of the Al-based alloy include an aluminum simple substance and duralumin.

As the Ti-based alloy, a titanium simple substance or an alloy of titanium and a metallic element such as aluminum, vanadium, niobium, zirconium, tantalum, or molybdenum can be exemplified. Specific examples thereof include Ti-6Al-4V and Ti-6Al-7Nb. The Ti-based alloy may include a non-metallic element such as boron, carbon, nitrogen, oxygen, or silicon other than these metallic elements.

Such a metal powder may be produced by any method, but it is possible to use a metal powder produced by an atomization method (a water atomization method, a gas atomization method, a high-speed rotating water stream atomization method, and the like), a reduction method, a carbonyl method, a grinding method, or the like.

Among these metal powders, a metal powder produced by an atomization method is preferably used. According to an atomization method, it is possible to efficiently produce a metal powder having an extremely small average particle diameter as described above. In addition, it is possible to obtain a metal powder in which a variation in particle diameter is small, and the particle diameter is uniform. Therefore, when such a metal powder is used, it is possible to reliably prevent the generation of pores in a sintered compact, and it is thereby possible to improve the density.

In addition, a metal powder produced by an atomization method has a spherical shape relatively close to a perfect sphere, whereby the metal powder has excellent dispersibility and fluidity with respect to the binder. Therefore, it is possible to increase a filling property when filling a granulated powder into a mold, and eventually, it is possible to obtain a denser sintered compact.

Examples of the ceramic material include oxide-based ceramic materials such as alumina, magnesia, beryllia, zirconia, yttria, forsterite, steatite, wollastonite, mullite, cordierite, ferrite, sialon, and cerium oxide; and non-oxide-based ceramic materials such as silicon nitride, aluminum nitride, boron nitride, titanium nitride, silicon carbide, boron carbide, titanium carbide, and tungsten carbide, among these ceramic materials, one ceramic material or a mixture of two or more ceramic materials is used.

The average particle diameter of the inorganic powder to be used in the embodiment of the invention is preferably 1 μm or more and 30 μm or less, more preferably 3 μm or more and 20 μm or less, and further more preferably 3 μm or more and 10 μm or less. If the inorganic powder has an average particle diameter within the above range, it is possible to eventually produce a sufficiently dense sintered compact while avoiding significant aggregation or a decrease in compressibility when molding.

If the average particle diameter is less than the above lower limit, the inorganic powder is liable to aggregate, and the compressibility when molding may be significantly deteriorated. On the other hand, if the average particle diameter exceeds the above upper limit, an interspace between powder particles is increased in size too much, and the densification of the finally obtained sintered compact may be insufficient.

The average particle diameter is obtained by a laser diffraction method as a particle diameter when the cumulative amount of a powder on a volume basis reaches 50%.

In the case where the inorganic powder to be used in the embodiment of the invention is composed of an Fe-based alloy, the tap density thereof is preferably 3.5 g/cm$^3$ or more, more preferably 3.8 g/cm$^3$ or more. If the inorganic powder has a high tap density as described above, the filling property in the interspace between the particles when molding is particularly enhanced. Due to this, it is possible to eventually obtain a particularly dense sintered compact. The tap density of the inorganic powder can be measured according to, for example, the method for measuring a tap density specified in JIS Z 2512.

The specific surface area of the inorganic powder to be used in the embodiment of the invention is not particularly limited, but is preferably 0.15 m$^2$/g or more and 0.8 m$^2$/g or less, more preferably 0.2 $m^2/g$ or more and 0.7 $m^2/g$ or less, and further more preferably 0.3 $m^2/g$ or more and 0.6 $m^2/g$ or less. If the inorganic powder has a large specific surface area as described above, the surface activity (surface energy) is increased, and therefore, sintering can be achieved even by applying less energy. Therefore, when a molded body is sintered, the sintering can be achieved in a shorter time, and the shape retainability is enhanced. On the other hand, if the specific surface area exceeds the above upper limit, a contact area between the inorganic powder and the binder is increased more than necessary, and the stability and fluidity of the composition for injection molding may be deteriorated. The specific surface area of the inorganic powder can be measured according to, for example, the method for measuring a specific surface area of a powder (solid) by gas adsorption specified in JIS Z 8830.

Binder

The binder to be used in the embodiment of the invention contains, as described above, a polyacetal-based resin as a component A and an ethylene-glycidyl methacrylate-based copolymer as a component B. Hereinafter, the respective components will be described in detail.

Component A

The component A is a polyacetal-based resin. The polyacetal-based resin is a polymer having an oxymethylene structure as a unit structure and may be a homopolymer containing only formaldehyde as a monomer, a copolymer containing formaldehyde and a monomer other than formaldehyde, or the like. However, from the viewpoint of enhancement of shape retainability, a copolymer is preferably used. Examples of the monomer (comonomer) other than formaldehyde in the copolymer include oxyalkylenes such as oxyethylene and oxypropylene, and also include epichlorohydrin, 1,3-dioxolane, diethylene glycol formal, 1,4-butanediol formal, and 1,3-dioxane, and particularly a monomer having an oxyalkylene unit having 2 or more carbon atoms per molecule is preferably used. The copolymerization amount of the comonomer is not particularly limited, but is preferably 1 part by mole or more and 10 parts by mole or less, more preferably 1 part by mole or more and 6 parts by mole or less with respect to 100 parts by mole of the main monomer. The monomer sequence in such a copolymer is not particularly limited, and any of random copolymerization, alternating copolymerization, block copolymerization, and graft copolymerization may be used. As such a polyacetal-based resin, for example, Delrin manufactured by Du Pont, Inc., Duracon manufactured by Polyplastics Co., Ltd., Tenac manufactured by Asahi Kasei Chemicals Corporation, Iupital manufactured by Mitsubishi Engineering-Plastics Corporation, Polypenco Acetal manufactured by Quadrant Polypenco Japan Ltd., Amilus manufactured by Toray Industries, Inc., or the like can be used. Further, the component A has a tensile strength of preferably about 30 MPa or more and 90 MPa or less, and more preferably about 40 MPa or more and 80 MPa or less. If the component A has a tensile strength within the above range, the shape retainability of the molded body after molding can be particularly enhanced.

Component B

The component B is an ethylene-glycidyl methacrylate-based copolymer. The ethylene-glycidyl methacrylate-based copolymer is a copolymer having an ethylene structure and a glycidyl methacrylate structure as unit structures. Further, the component B may contain, as another comonomer, one or more structures of carboxylic acid vinyl esters such as vinyl acetate, vinyl propionate, methyl acrylate, ethyl acrylate, butyl acrylate, methyl methacrylate, ethyl methacrylate, and butyl methacrylate; and ethylenically unsaturated ester compounds such as an $\alpha,\beta$-unsaturated carboxylic acid alkyl ester. Among these, particularly, the component B preferably contains at least one of vinyl acetate and methyl acrylate. According to this, the composition for injection molding capable of molding a molded body having particularly high shape retainability is obtained, and it is possible to eventually produce a sintered compact which is particularly less deformed, chipped, or the like and has high quality.

Here, as described above, the composition for injection molding of the embodiment of the invention includes a binder containing a polyacetal-based resin as the component A and an ethylene-glycidyl methacrylate-based copolymer as the component B.

The present inventors made intensive studies of the cause of the low shape retainability of a composition for injection molding in the related art when degreasing and the occurrence of a defect such as deformation or chipping after sintering.

As a result, they found that the cause of the low shape retainability is that a metallic element in the inorganic powder performs a catalytic function to accelerate the decomposition of the binder, whereby the binder is decomposed more than necessary and the original function of the binder to bind the inorganic powder particles to one another is deteriorated. On the basis of this finding, they found that the above problem can be solved by incorporating both the components A and B as a binder.

Specifically, when the binder contains the above-described two components, the component B flows at the time of kneading the starting materials and penetrates to cover the inorganic powder particles. This is because since the softening point of the component B is relatively lower than that of the component A, the component B is transformed into a liquid prior to the component A so that the component B can penetrate into an interspace between the inorganic powder particles and the binder. Moreover, since the component B when softening has relatively high fluidity after softening, the component B can efficiently penetrate also into a small space by a capillary phenomenon. As a result, in the kneaded material (the composition for injection molding) obtained by kneading the starting materials, the component B is present so as to cover the inorganic powder particles, and the component A is present so as to cover the outer side thereof (e.g., each inorganic powder particle is encased by the component B, and the component B encasing inorganic powder particles are within the component A). Further, the significant decomposition of the component A is suppressed and the component A can be gradually decomposed in a degreasing step, and therefore, a decrease in shape retainability is suppressed.

Figure 2:
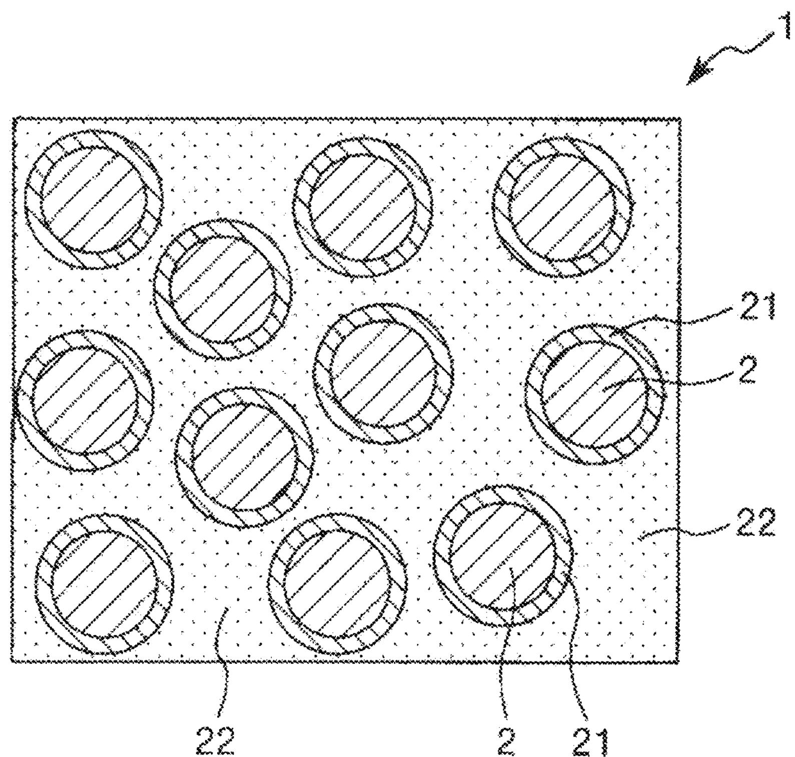
FIG. 2 is a cross-sectional view schematically showing a structure of a composition for injection molding according to an embodiment of the invention when kneading.

FIG. 1 is a cross-sectional view schematically showing a structure of the composition for injection molding of the embodiment of the invention, and FIG. 2 is a cross-sectional view schematically showing a structure of the composition for injection molding of the embodiment of the invention when kneading.

As shown in FIG. 1, in a composition for injection molding 10, a plurality of inorganic powder particles 2 are dispersed in a binder 3. In the binder 3, a component A and a component B intermingle with each other.

When kneading such a composition for injection molding 10, the temperature of the composition for injection molding 10 is increased by heating from the outside or self-heating accompanying kneading. As a result, as shown in FIG. 2, in the obtained kneaded material 1, an inner layer 21 composed mainly of the component B is formed so as to cover the surface of each particle 2, and an outer layer 22 composed mainly of the component A is located outside the inner layer 21. If such an inner layer 21 is formed, the inner layer 21 serves as a partition and prevents the contact between the metallic element in the particle 2 and the outer layer 22, whereby the above-described catalytic function is suppressed. As a result, the rapid decomposition of the binder 3 is suppressed, and a decrease in shape retainability can be avoided.

Since the inner layer 21 is in contact with the particle 2, the inner layer 21 should have an ability to resist the above-described catalytic function, and on the other hand, the outer layer 22 preferably has excellent fluidity although the outer layer 22 has a higher softening point than the inner layer 21. In view of this, the present inventors found that by using a polyacetal-based resin as the component A and an ethylene-glycidyl methacrylate-based copolymer as the component B, both of the above-described goals can be reliably achieved. By providing the inner layer 21, when a molded body is subjected to a degreasing treatment, the outer layer 22 is not rapidly decomposed by heat, but instead is gradually decomposed by heat, and therefore, the shape of the molded body is maintained. Since the ethylene-glycidyl methacrylate-based copolymer has an excellent blocking property against the catalytic function of the metallic element and excellent compatibility with the polyacetal-based resin, the moldability can be further enhanced. Accordingly, both the shape retainability and the moldability can be achieved. Here, the component B contains a glycidyl group. The glycidyl group is ring-opened during kneading and molding, and binds to a hydroxy group on the surfaces of the inorganic powder particles. As a result, high adhesiveness is exhibited between the inorganic powder and the component B, resulting in stably forming the inner layer 21. On the other hand, it is considered that the ethylene structure provides the above-described blocking property and also provides the compatibility with the component A.

When the component B contains a unit structure derived from the above-described ethylenically unsaturated ester compound, this ethylenically unsaturated ester compound more reliably binds the particles 2 to one another, and therefore, the shape retainability can be particularly enhanced.

The thickness of the inner layer 21 is not particularly limited as long as the inner layer 21 completely covers the surface of the particle 2, however, for example, an average thickness thereof is preferably 1 nm or more and 2000 nm or less, more preferably 2 nm or more and 1000 nm or less. According to this, both the shape retainability and the moldability (shape transferability) can be highly achieved. If the average thickness of the inner layer 21 is lower than the above lower limit, the inner layer 21 is likely to be discontinuous, and therefore, the particle 2 and the outer layer 22 may come into contact with each other. On the other hand, if the average thickness thereof exceeds the above upper limit, the ratio of the outer layer 22 is relatively decreased, and therefore, the moldability may be deteriorated.

The outer layer 22 need not be in the form of a layer as long as it is located outside the inner layer 21, and may be in the form such that the outer layers 22 associated with the respective particles 2 are connected to one another, i.e., as shown in FIG. 2, in the kneaded material 1, the outer layer 22 may be in the form of a matrix in which the particles 2 are dispersed. Similarly, the inner layers 21 may not be independent of one another with respect to each particle 2, and may be distributed so as to connect the particles 2 to one another.

The inner layer 21 may be mainly composed of the component B, but may contain the component A or another component. Similarly, the outer layer 22 may be mainly composed of the component A, but may contain the component B or another component. The content of the component B in the inner layer 21 may be more than 50% on a mass basis, and similarly, the content of the component A in the outer layer 22 may be more than 50% on a mass basis.

At a boundary between the inner layer 21 and the outer layer 22, the constituent materials may continuously change through the interface, however, it is preferred that the constituent materials discontinuously change. According to such a configuration, the interface between the inner layer 21 and the outer layer 22 serves as a sliding surface, and the fluidity of the composition for injection molding is particularly improved. As a result, the moldability at the time of injection molding is particularly enhanced, and eventually, a sintered compact having high dimensional accuracy is obtained.

The amount of the component B in the composition for injection molding is set to 1% by mass or more and 30% by mass or less, and preferably 2% by mass or more and 20% by mass or less with respect to the amount of the component A. By setting the amount of the component B within the above range, both the shape retainability and the moldability can be highly achieved. The softening point of the component B is preferably 65° C. or higher and 105° C. or lower, and more preferably 70° C. or higher and 100° C. or lower. According to this, when kneading or molding the composition for injection molding, the component B can be reliably softened, whereby the inner layer 21 can be formed. A difference in softening point between the component B and the component A is preferably 55° C. or more and 120° C. or less, and more preferably 60° C. or more and 115° C. or less. If the difference in softening point between the component B and the component A is within the above range, both the shape retainability and the moldability can be more highly achieved. As the unit structures constituting the ethylene-glycidyl methacrylate-based copolymer as the component B, an ethylene structure, a glycidyl methacrylate structure, an ethylenically unsaturated ester compound structure, and the like can be used as described above, and the abundance ratios of these structures are as follows: the ratio of the ethylene structure is about 60 to 99.9% by mass, the ratio of the glycidyl methacrylate structure is about 0.1 to 20% by mass, and the ratio of the ethylenically unsaturated ester compound structure is about 0 to 39.9% by mass.

Particularly, the ratio of the glycidyl methacrylate structure is preferably 1 part by mass or more and 30 parts by mass or less, and more preferably 2 parts by mass or more and 25 parts by mass or less with respect to 100 parts by mass of the ethylene structure. According to this, a balance between the compatibility with the component A attributed to the ethylene structure and the affinity for the particle 2 attributed to the glycidyl methacrylate structure can be highly achieved, and therefore, both the shape retainability and the moldability can be particularly enhanced.

The ratio of the ethylenically unsaturated ester compound structure is preferably 20 parts by mass or more and 80 parts by mass or less, and more preferably 25 parts by mass or more and 75 parts by mass or less with respect to 100 parts by mass of the glycidyl methacrylate structure.

The melt flow rate of the component B is preferably about 0.5 g/10 min or more and 50 g/10 min or less, and more preferably about 3 g/10 min or more and 40 g/10 min or less. If the melt flow rate is within the above range, the inner layer 21 is reliably formed, and therefore, the shape retainability of the composition for injection molding of the embodiment of the invention is particularly improved. The melt flow rate can be measured at a temperature of 190° C. under a load of 2.16 kg according to the method specified in JIS K 6922-2.

The tensile strength of the component B is preferably about 4 MPa or more and 25 MPa or less, and more preferably about 5 MPa or more and 20 MPa or less. According to this, the component B has high fluidity also when softening, and therefore, the inner layer 21 can be more reliably formed. The weight average molecular weight of the component B is appropriately set in consideration of the melt flow rate as described above or the like, however, it is, for example, preferably 10,000 or more and 400,000 or less, and more preferably 30,000 or more and 300,000 or less.

Another Component

The binder to be used in the embodiment of the invention may contain another component.

For example, a wax is preferably used. Examples of the wax include natural waxes including vegetable waxes such as candelilla wax, carnauba wax, rice wax, Japan wax, and jojoba wax; animal waxes such as beeswax, lanolin, and spermaceti wax; mineral waxes such as montan wax, ozokerite, and ceresin; and petroleum-based waxes such as paraffin wax, microcrystalline wax, and petrolatum; and synthetic waxes including synthetic hydrocarbons such as polyethylene wax; modified waxes such as montan wax derivatives, paraffin wax derivatives, and microcrystalline wax derivatives; hydrogenated waxes such as hydrogenated castor oil and hydrogenated castor oil derivatives; fatty acids such as 12-hydroxystearic acid; acid amides such as stearic acid amide; and esters such as phthalic anhydride imide. Among these waxes, one wax can be used or two or more waxes can be used in combination. By incorporating such a wax, the fluidity of the composition for injection molding is increased, and therefore the moldability thereof is further enhanced.

As the wax, particularly a petroleum-based wax or a modified product thereof is preferably used, and paraffin wax, microcrystalline wax, carnauba wax, or a derivative thereof is more preferably used, and paraffin wax or carnauba wax is further more preferably used. Such a wax has excellent compatibility with the component A, and therefore enables the preparation of a homogeneous binder. Accordingly, such a wax contributes to the production of the composition of injection molding having high moldability.

The weight average molecular weight of the wax is preferably 100 or more and less than 10,000, and more preferably 200 or more and 5,000 or less. By setting the weight average molecular weight of the wax within the above range, the inorganic powder and the binder can be more uniformly mixed, and therefore, the moldability of the composition for injection molding can be further enhanced.

The content of the wax in the binder is preferably 0.1% by mass or more and 20% by mass or less, and more preferably 1% by mass or more and 15% by mass or less. By setting the content of the wax within the above range, the fluidity of the composition for injection molding can be particularly increased.

The ratio of the wax to the component B is preferably 0.01 or more and 0.5 or less, and more preferably 0.02 or more and 0.4 or less. By setting the ratio of the wax to the component B within the above range, a balance between the component B and the wax is optimized, and therefore, the moldability can be enhanced without impairing the shape retainability when degreasing.

As the wax, a wax having a softening point of 30° C. or higher and 200° C. or lower is preferably used, and a wax having a softening point of 50° C. or higher and 150° C. or lower is more preferably used.

Additional examples of the another component include higher fatty acids such as stearic acid, oleic acid, and linoleic acid; higher fatty acid amides such as stearic acid amide, palmitic acid amide, and oleic acid amide; higher alcohols such as stearin alcohol and ethylene glycol; fatty acid esters such as palm oil; phthalic acid esters such as diethyl phthalate and dibutyl phathalate; adipic acid esters such as dibutyl adipate; sebacic acid esters such as dibutyl sebacate; polyvinyl alcohol, polyvinylpyrrolidone, polyether, polypropylene carbonate, ethylenebisstearamide, sodium alginate, agar, gum arabic, resins, sucrose, and ethylene-vinyl acetate copolymers (EVA). Among these components, one component can be used or two or more components can be used in combination.

Among these, as the higher fatty acid, particularly, a saturated fatty acid such as lauric acid, myristic acid, palmitic acid, stearic acid, or arachidic acid is preferably used. Such a saturated fatty acid contains a long-chain alkyl group, but does not contain an unsaturated bond, and therefore functions as a lubricant and can further enhance the moldability of the composition for injection molding.

The content of the saturated fatty acid in the binder is preferably 0.1% by mass or more and 10% by mass or less, and more preferably 1% by mass or more and 8% by mass or less. By setting the content of the saturated fatty acid within the above range, the moldability of the composition for injection molding can be particularly enhanced.

The ratio of the saturated fatty acid to the component B is preferably 0.01 or more and 1 or less, and more preferably 0.02 or more and 0.5 or less. By setting the ratio of the saturated fatty acid to the component B within the above range, both the shape retainability and the moldability can be more highly achieved.

Further additional examples of the other component include polyolefins such as polyethylene, polypropylene, polybutylene, and polypentene; polyolefin-based copolymers such as a polyethylene-polypropylene copolymer and a polyethylene-polybutylene copolymer; and hydrocarbon-based resins such as polystyrene.

The composition for injection molding may further contain an antioxidant, a degreasing accelerating agent, a surfactant, or the like other than the above-described components.

The content of the binder in the composition for injection molding is appropriately set according to the metal powder or the ceramic powder, however, it is set to preferably about 1 part by mass or more and 50 parts by mass or less, and more preferably about 3 parts by mass or more and 30 parts by mass or less with respect to 100 parts by mass of the inorganic powder. According to this, the shape retainability of the composition for injection molding when degreasing is particularly enhanced.

The composition for injection molding is prepared by kneading the above-described inorganic powder, binder, and the like. When kneading these components, any of various kneading machines, for example, a pressure or double-arm kneader-type kneading machine, a roller-type kneading machine, a Banbury-type kneading machine, a single-screw or twin-screw extruding machine, or the like can be used.

The kneading conditions may vary depending on various conditions such as the particle diameter of the metal powder to be used, the mixing ratio of the metal powder to the binder composition, and the like, however, for example, the kneading temperature can be set to 50 to 200° C., and the kneading time can be set to 15 to 210 minutes.

Method for Producing Sintered Compact

Hereinafter, a method for producing a sintered compact according to an embodiment of the invention will be described. The method for producing a sintered compact includes: a kneading step in which an inorganic powder and a binder are kneaded, thereby obtaining a kneaded material (the composition for injection molding); a molding step in which the thus obtained kneaded material is molded into a desired shape; a degreasing step in which the thus obtained molded body is degreased; and a firing step in which the thus obtained degreased body is fired. Hereinafter, the respective steps will be sequentially described.

Kneading Step

The kneaded material is prepared by kneading the above-described inorganic powder, binder, and the like. When kneading these components, any of various kneading machines, for example, a pressure or double-arm kneader-type kneading machine, a roller-type kneading machine, a Banbury-type kneading machine, a single-screw or twin-screw extruding machine, or the like can be used.

The kneading temperature in the kneading step is preferably set according to the softening points of the components A and B. Specifically, since the ethylene-glycidyl methacrylate-based copolymer as the component B has a lower softening point than the polyacetal-based resin as the component A, the initial kneading temperature is preferably set to a temperature between the softening point of the component A and a temperature lower than the softening point of the component A by about 10° C. By kneading the components at such a temperature, only the component B is softened as the temperature is raised when kneading so that it becomes easy for the component B to penetrate between the particle 2 and the component A. As a result, the inner layer 21 and the outer layer 22 are formed, whereby both the shape retainability and the moldability can be highly achieved.

When the softening point of the component A is represented by $T_A$° C. and the softening point of the component B is represented by $T_B$° C., as described above, the kneading temperature is preferably $(T_A-10)$° C. or higher and $T_A$° C. or lower, more preferably $(T_A-10)$° C. or higher and $(T_A-2)$° C. or lower. By kneading the components at such a temperature, the above-described effect becomes more pronounced. Further, it is preferred that such a kneading temperature is maintained for about 5 minutes or more and 180 minutes or less, with the proviso that $T_A$ and $T_B$ preferably satisfy the relationship: $T_A-10>T_B$.

After completing the kneading under the above conditions, kneading may be performed at a temperature higher than the softening point of the component A ($T_A$) in the end. According to this, also the component A is softened, and the fluidity of the entire kneaded material is further improved. In this case, the final kneading temperature is preferably higher than $T_A$° C. and $(T_A+70)$° C. or lower.

The total kneading time is preferably about 15 minutes or more and 210 minutes or less.

The viscosity of the thus obtained kneaded material is preferably 500 P or more and 7,000 P or less (50 Pa·s or more and 700 Pa·s or less), more preferably 1,000 P or more and 6,000 P or less (100 Pa·s or more and 600 Pa·s or less). According to this, the moldability when molding can be particularly enhanced. The viscosity is measured using a capirograph by maintaining the temperature of the kneaded material at 190° C. As the binder to be subjected to this step, a binder in the form of a powder is preferably used. When transforming the binder into a powder, a common grinding method is used, however, particularly, cryogenic grinding is preferably used. A binder powder obtained by cryogenic grinding is particularly fine and uniform, and moreover, has the original binder property since a heating effect when grinding is suppressed. Therefore, the above-described effect on the basis of the difference in softening point between the component A and the component B is more reliably exhibited. As a result, the inner layer 21 and the outer layer 22 are reliably formed around the circumference of the inorganic powder particle, whereby a kneaded material which can highly achieve both the shape retainability and the moldability is obtained.

The cryogenic grinding is a method of finely and uniformly grinding a sample by utilizing the brittleness caused by the freezing of the sample. In the cryogenic grinding, a cryogenic grinding machine is used. The cryogenic grinding machine is provided with a grinding vessel, in which a sample is placed, and steel balls, which reciprocate in the grinding vessel, and by causing the steel balls to reciprocate while cooling the grinding vessel with a cooling agent such as liquid nitrogen, a sample in the grinding vessel is ground. As cooling progresses, the sample becomes brittle, and therefore, a sample with flexibility can also be ground. The above-described cryogenic grinding machine is described as one example, and a cryogenic grinding machine having other structure can also be used.

By subjecting the binder to cryogenic grinding, the binder can be ground finely and uniformly without denaturing the binder. In the case of using a grinding method other than cryogenic grinding, heat is generated in the binder as grinding progresses, and due to this heat, denaturation, melting (softening), or decomposition may occur, however, by using cryogenic grinding, this denaturation, melting, or decomposition can be prevented. As a result, the binder is to be subjected to the following step while maintaining the original property, and therefore, a decrease in shape retainability of a molded body is prevented. Eventually, it is possible to produce a sintered compact which is less deformed, chipped, or the like and has high quality.

When using cryogenic grinding, the resulting powder is fine and has a large specific surface area and also has a high surface activity. Such a powder has high affinity for the inorganic powder, and when mixing the binder powder with the inorganic powder, the powder contributes to the suppression of the occurrence of a problem such as uneven mixing. Accordingly, the use of cryogenic grinding enables the production of a particularly uniform composition for injection molding.

As the cooling agent in cryogenic grinding, other than liquid nitrogen as described above, liquid air, liquid oxygen, dry ice, or the like may be used.

In the case of performing cryogenic grinding, cryogenic grinding may be performed after mixing the components A and B, or the components A and B may be separately subjected to cryogenic grinding, however, from the viewpoint of obtaining a homogeneous kneaded material by uniformly mixing the components A and B, the latter process is preferred.

The thus obtained binder powder has an average particle diameter of preferably about 10 μm or more and 500 μm or less, and more preferably about 15 μm or more and 400 μm or less. By grinding the binder through cryogenic grinding to a particle diameter within the above range, the effect of a difference in specific gravity during mixing can be suppressed to minimum, and therefore, the binder powder and the inorganic powder can be uniformly mixed.

Particularly, in the case of grinding the components A and B separately, the average particle diameter of the binder powder of the component A is preferably 3 times or more and 20 times or less, and more preferably 7 times or more and 15 times or less larger than that of the inorganic powder. Meanwhile, the average particle diameter of the binder powder of the component B is preferably 3 times or more and 50 times or less, and more preferably 5 times or more and 30 times or less larger than that of the inorganic powder. According to this, the binder powder and the inorganic powder can be more uniformly mixed. The average particle diameter of the binder powder of the component B is preferably 2 times or more and 15 times or less, and more preferably 3 times or more and 10 times or less larger than that of the binder powder of the component A. According to this, the binder powder of the component A and the binder powder of the component B can be more uniformly mixed.

The average particle diameter is obtained by a laser diffraction method as a particle diameter when the cumulative amount of a powder on a volume basis reaches 50%.

Molding Step

First, the composition for injection molding of the embodiment of the invention as described above is molded. According to this, a molded body having a desired shape and dimension is produced.

As the molding method, an injection molding method is used. Incidentally, prior to injection molding, the composition for injection molding may be subjected to a pelletization treatment as needed. The pelletization treatment is a treatment in which a compound is ground using a grinding device such as a pelletizer. The thus obtained pellets have an average particle diameter of about 1 mm or more and 10 mm or less. Subsequently, the thus obtained pellets are placed in an injection molding machine and injected into a mold to effect molding. According to this, a molded body to which the shape of the mold has been transferred is obtained.

The shape and dimension of the molded body to be produced are determined in anticipation of the amount of shrinkage by degreasing and sintering to be performed thereafter.

The resulting molded body may be subjected to post-processing such as mechanical processing or laser processing as needed. The injection pressure for the composition for injection molding is preferably from about 5 to 500 MPa.

Further, it is preferred that not only the temperature in the molding step, but also the temperature when the composition for injection molding is kneaded (kneading temperature) is set in the same manner as the above-described molding temperature. According to this, the inner layer 21 is formed also at the kneading stage, and therefore, the fluidity of the kneaded material is improved and uniform kneading can be achieved. Accordingly, also the resulting molded body becomes homogeneous, and the shape retainability and the moldability are further improved.

Degreasing Step

Subsequently, the thus obtained molded body is subjected to a degreasing treatment. According to this, the binder contained in the molded body is removed (degreased), whereby a degreased body is obtained.

The component B is decomposed and discharged outside before the component A when degreasing or molding prior to degreasing in many cases. At this time, a flow path is formed in the molded body. In the degreasing step, a decomposed product of the component A is discharged through this flow path, and therefore, a degreasing treatment can be performed while preventing the occurrence of a crack or the like in the molded body. As a result, the shape retainability of the molded body (degreased body) can be particularly enhanced.

The degreasing treatment is not particularly limited, but is performed by a heat treatment in an oxidative atmosphere such as oxygen gas or nitric acid gas, and other than this, in a non-oxidative atmosphere, for example, under vacuum or a reduced pressure (for example, $1.33\times10^{-4}$ Pa or more and 13.3 Pa or less), or in a gas such as nitrogen gas or argon gas. The treatment temperature in the degreasing step (heat treatment) is not particularly limited, but is preferably 100° C. or higher and 750° C. or lower, and more preferably 150° C. or higher and 700° C. or lower.

The treatment time (heat treatment time) in the degreasing step (heat treatment) is not particularly limited, but is preferably 0.5 hours or more and 20 hours or less, and more preferably 1 hour or more and 10 hours or less.

The degreasing by such a heat treatment may be performed by being divided into a plurality of steps (stages) for various purposes (for example, for the purpose of reducing the degreasing time, and the like). In this case, for example, a method in which degreasing is performed at a low temperature in the former half and at a high temperature in the latter half, a method in which degreasing at a low temperature and degreasing at a high temperature are alternately repeated, or the like can be used.

After the degreasing treatment as described above, the thus obtained degreased body may be subjected to various post-processing treatments for the purpose of, for example, deburring, forming a microstructure such as a groove, and the like.

It is not necessary to completely remove the binder in the molded body by the degreasing treatment, and for example, the binder may partially remain therein at the time of completion of the degreasing treatment.

Firing Step

Subsequent to the degreasing treatment, the degreased body is fired. According to this, the degreased body is sintered, whereby a sintered compact (the sintered compact of the embodiment) is obtained.

The firing conditions are not particularly limited, but the firing step is performed by a heat treatment in a non-oxidative atmosphere, for example, under vacuum or a reduced pressure (for example, $1.33\times10^{-4}$ Pa or more and 133 Pa or less), or in an inert gas such as nitrogen gas or argon gas. According to this, the oxidation of the metal powder can be prevented. In the case where a metal material is contained in the inorganic powder, it is preferred that when firing, the degreased body is placed in a vessel composed of a metal material of the same type as the metal material contained in the inorganic powder, and the degreased body is fired in such a state. According to this, the metal component in the degreased body is hardly evaporated, and therefore, the metal composition of the finally obtained sintered compact can be prevented from deviating from the intended composition.

As the vessel to be used, a vessel not having an airtight structure, but instead having an appropriate pore or aperture is preferred. According to this, the atmosphere in the inside of the vessel is made the same as that in the outside of the vessel, and can be prevented from changing to an undesired atmosphere. Further, it is preferred that there is a sufficient space between the vessel and the degreased body without adhering to each other as much as possible.

The atmosphere in which the firing step is performed may be changed in the course of the firing step. For example, the initial firing atmosphere is set to a reduced pressure atmosphere, and then, the atmosphere can be changed to an inert atmosphere in the course of the firing step.

The firing step may be performed by being divided into two or more stages. According to this, sintering efficiency is improved, and sintering can be achieved in a shorter firing time.

It is preferred that the firing step is performed continuously with the above-described degreasing step. According to this, the degreasing step can also serve as a pre-sintering step, and therefore, preheating is provided for the degreased body and the degreased body can be more reliably sintered.

The firing temperature is appropriately set according to the type of the inorganic powder. However, in the case of the metal powder, the firing temperature is preferably 1,000° C. or higher and 1,650° C. or lower, and more preferably 1,050°

C. or higher and 1,500° C. or lower. Meanwhile in the case of the ceramic powder, the firing temperature is preferably 1,250° C. or higher and 1,900° C. or lower, and more preferably 1,300° C. or higher and 1,800° C. or lower.

The firing time is preferably 0.5 hours or more and 20 hours or less, and more preferably 1 hour or more and 15 hours or less.

Such a firing step may be performed by being divided into a plurality of steps (stages) for various purposes (for example, for the purpose of reducing the firing time). In this case, for example, a method in which firing is performed at a low temperature in the former half and at a high temperature in the latter half, a method in which firing at a low temperature and firing at a high temperature are alternately repeated, or the like can be used.

After the firing step as described above, the thus obtained sintered compact may be subjected to mechanical processing, electric discharge processing, laser processing, etching, or the like for the purpose of, for example, deburring, forming a microstructure such as a groove, or the like The obtained sintered compact may be subjected to an HIP treatment (hot isostatic press treatment) or the like as needed. According to this, the density of the sintered compact can be further increased.

As for the conditions for the HIP treatment, for example, the temperature is set to 850° C. or higher and 1,100° C. or lower, and the time is set to 1 hour or more and 10 hours or less. Further, the pressure to be applied is preferably 50 MPa or more, and more preferably 100 MPa or more.

The sintered compact obtained as described above may be used in any purpose, and as the use thereof, various structural parts, various medical structures, and the like can be exemplified. The relative density of the thus obtained sintered compact is expected to be, for example, 95% or more, and preferably 96% or more. Such a sintered compact has a high sintering density and has excellent appearance and dimensional accuracy. Further, the tensile strength of the sintered compact is expected to be, for example, 900 MPa or more in the case of using a metal powder. In addition, the 0.2% proof stress of the sintered compact is expected to be, for example, 750 MPa or more in the case of using a metal powder.

Hereinabove, the invention has been described based on preferred embodiments, however, the invention is not limited thereto.

EXAMPLES

Next, specific Examples will be described.

1. Production of Sintered Compact

Example 1

First, an SUS316L powder (powder No. 1) produced by a water atomization method was prepared. The average particle diameter of the SUS316L powder was measured using a laser diffraction particle size distribution analyzer (Microtrac HRA 9320-X100, manufactured by Nikkiso Co., Ltd.). The measured values are shown in Table 1.

TABLE 1

| | Formulation | Average particle diameter [μm] | Amount of binder with respect to 100 parts by mass of powder (parts by mass) |
|---|---|---|---|
| Powder No. 1 | SUS316L | 10 | 10 |
| Powder No. 2 | 2% Ni-Fe | 6 | 9 |
| Powder No. 3 | Ti-6Al-4V | 17 | 11 |
| Powder No. 4 | Alumina | 0.5 | 30 |

On the other hand, a binder having a formulation shown in Table 2 was prepared, and a component A, a component B, and another component such as a lubricant were separately cryogenically ground. By doing this, a first binder powder obtained by cryogenically grinding the component A, a second binder powder obtained by cryogenically grinding the component B, and a third binder powder obtained by cryogenic grinding the lubricant or the like were separately produced.

Specifically, a starting material such as the component A was placed in a grinding vessel and ground while cooling with liquid nitrogen. The grinding conditions for the cryogenic grinding were set such that the material temperature was −196° C., the grinding machine temperature was −15° C., and the grinding machine rotation speed was 5,200 rpm. The average particle diameters of the obtained first binder powder, second binder powder, and third binder powder were 53 μm, 242 μm, and 200 μm, respectively.

Subsequently, the SUS316L powder and the binder powders were mixed and kneaded using a pressure kneader (kneading machine) at a kneading temperature of 160° C. for 30 minutes. This kneading was performed in a nitrogen atmosphere. The mixing ratio of the SUS316L powder and the binder is shown in Table 1.

Subsequently, the thus obtained kneaded material was ground using a pelletizer, whereby pellets having an average particle diameter of 5 mm were obtained.

Then, the thus obtained pellets were molded by an injection molding machine under the molding conditions that the material temperature was 190° C. and the injection pressure was 10.8 MPa (110 kgf/cm$^2$). By doing this, a molded body was obtained. The molded body had a cylindrical shape with a diameter of 0.5 mm and a height of 0.5 mm.

Subsequently, the molded body was subjected to a degreasing treatment under the degreasing conditions that the temperature was 500° C., the time was 1 hour, and the atmosphere was nitrogen gas (atmospheric pressure). By doing this, a degreased body was obtained.

Subsequently, the degreased body was subjected to a firing treatment under the firing conditions that the temperature was 1,270° C., the time was 3 hours, and the atmosphere was nitrogen gas (atmospheric pressure). By doing this, a sintered compact was obtained.

Examples 2 to 13

Sintered compacts were obtained in the same manner as in Example 1 except that a binder having a formulation shown in Table 2 was used as the binder. Incidentally, in Example 12, the kneading temperature was set to 155° C.

Comparative Examples 1 to 6

Sintered compacts were obtained in the same manner as in Example 1 except that the powder No. 1 was used as the inorganic powder and a binder having a formulation shown in Table 2 was used as the binder.

TABLE 2

| | Classification | Component | Softening point | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|---|
| Binder | Component A | Tenac HC750 | 170° C. | % by mass | 97 | 95 | 93 | 88 | 82 | 78 | 74 | 83 | 73 | 88 |
| | | Tenac 7520 | 160° C. | % by mass | | | | | | | | | | |
| | | Tenac 7054 | 165° C. | % by mass | | | | | | | | | | |
| | Component B | E-GMA-VA | 95° C. | % by mass | 1 | 3 | 5 | 10 | 15 | 20 | 22 | | | 8 |
| | | E-GMA-MA | 52° C. | % by mass | | | | | | | | 12 | | 2 |
| | | E-GMA | 103° C. | % by mass | | | | | | | | | 17 | |
| | Wax | Paraffin wax | 60° C. | % by mass | | | | | 1 | | | 2 | 3 | |
| | | Micro-crystalline wax | 70° C. | % by mass | | | | | | 1 | | | | |
| | | Polyethylene wax | 110° C. | % by mass | | | | | | | 1 | | | |
| | Other | Dibutyl phthalate | — | % by mass | | | | | | | | 1 | | |
| | | Stearic acid | 70° C. | % by mass | 2 | 2 | 2 | 2 | 2 | 1 | 3 | 2 | 5 | 2 |
| | EVA | | 45° C. | % by mass | | | | | | | | | 2 | |
| | Polystyrene | | — | % by mass | | | | | | | | | | |
| | Component B/Component A × 100 | | — | % by mass | 1.0 | 3.2 | 5.4 | 11.4 | 18.3 | 25.6 | 29.7 | 14.5 | 23.3 | 11.4 |
| | Wax/Component B | | — | — | 0.00 | 0.00 | 0.00 | 0.00 | 0.07 | 0.05 | 0.05 | 0.17 | 0.18 | 0.00 |
| | Stearic acid/Component B | | — | — | 2.00 | 0.67 | 0.40 | 0.20 | 0.13 | 0.05 | 0.14 | 0.17 | 0.29 | 0.20 |
| Inorganic powder | Metal powder | | — | — | No. 1 | No. 1 | No. 1 | No. 1 | No. 1 | No. 1 | No. 1 | No. 1 | No. 1 | No. 1 |
| Kneaded material | Viscosity | | — | P | 3900 | 3700 | 3400 | 4800 | 3200 | 3900 | 5300 | 5400 | 5500 | 3300 |
| Evaluation results of sintered compact | Sintering density | | — | — | 97.3 | 97.8 | 98.1 | 98.2 | 98.2 | 97.6 | 96.8 | 96.7 | 96.4 | 98.3 |
| | Appearance | | — | — | C | A | A | A | A | A | B | B | B | A |
| | Dimensional accuracy | | — | — | B | B | A | A | A | B | B | B | B | A |

| | Classification | Component | Softening point | Unit | Example 11 | Example 12 | Example 13 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Binder | Component A | Tenac HC750 | 170° C. | % by mass | 85 | | | 98 | 92 | | | 95.5 | 71 |
| | | Tenac 7520 | 160° C. | % by mass | | 90 | | | | | | | |
| | | Tenac 7054 | 165° C. | % by mass | | | 85 | | | | | | |
| | Component B | E-GMA-VA | 95° C. | % by mass | 10 | | | | | | | 0.5 | 25 |
| | | E-GMA-MA | 52° C. | % by mass | 1 | 8 | 3 | | | | | | |
| | | E-GMA | 103° C. | % by mass | | | 7 | | | | | | |
| | Wax | Paraffin wax | 60° C. | % by mass | 1 | | 2 | | 5 | 2 | 5 | | |
| | | Micro-crystalline wax | 70° C. | % by mass | 1 | | | | | | | | |
| | | Polyethylene wax | 110° C. | % by mass | | | | | | | | 1 | 1 |
| | Other | Dibutyl phthalate | — | % by mass | | | | | | 1 | | 10 | |
| | | Stearic acid | 70° C. | % by mass | 2 | 2 | 3 | 2 | 2 | 3 | 2 | 3 | 3 |
| | EVA | | 45° C. | % by mass | | | | | | | 40 | 43 | |
| | Polystyrene | | — | % by mass | | | | | | | 55 | 40 | |

TABLE 2-continued

| | | | | | | | | | | | | |
|---|---|---|---|---|---|---|---|---|---|---|---|---|
| | Component B/ Component A × 100 | — | % by mass | 12.9 | 8.9 | 11.8 | — | — | — | — | 0.5 | 35.2 |
| | Wax/Component B | — | — | 0.18 | 0.00 | 0.20 | — | — | — | — | 2.00 | 0.04 |
| | Stearic acid/ Component B | — | — | 0.18 | 0.25 | 0.30 | — | — | — | — | 6.00 | 0.12 |
| Inorganic powder | Metal powder | — | — | No. 1 | No. 1 | No. 1 | No. 1 | No. 1 | No. 1 | No. 1 | No. 1 | No. 1 |
| Kneaded material | Viscosity | — | P | 3400 | 4100 | 5000 | 7500 | 6900 | 6400 | 5900 | 6600 | 1700 |
| Evaluation results of sintered compact | Sintering density | — | — | 98.4 | 97.8 | 96.8 | 96.1 | 96.4 | 94.5 | 95.7 | 94.5 | 95.7 |
| | Appearance | — | — | A | B | B | D | D | D | D | D | C |
| | Dimensional accuracy | — | — | A | B | C | D | D | D | D | C | D |

*: E-GMA indicates that an ethylene structure and a glycidyl methacrylate structure are contained.

*: VA indicates that a vinyl acetate structure is contained, and MA indicates that a methyl acrylate structure is contained.

The components A and B in Table 2 shown above and Tables 3 to 5 shown below are the following compounds.

Component A

Tenac HC750: a polyacetal-based copolymer

Tenac 7520: a polyacetal-based copolymer

Tenac 7054: a polyacetal-based homopolymer

Component B

E-GMA-VA: a glycidyl methacrylate structure: 12% by mass, a vinyl acetate structure: 5% by mass, and an ethylene structure: remainder E-GMA-MA: a glycidyl methacrylate structure: 3% by mass, a methyl acrylate structure: 27% by mass, and an ethylene structure: remainder E-GMA: a glycidyl methacrylate structure: 12% by mass and an ethylene structure: remainder As for the melt flow rate of the component B, E-GMA-VA, E-GMA-MA, and E-GMA had melt flow rates of 7 g/10 min, 7 g/10 min, and 3 g/10 min, respectively.

Examples 14 to 16

First, a 2% Ni—Fe alloy powder (powder No. 2) produced by a water atomization method was prepared. The average particle diameter of the powder was measured using a laser diffraction particle size distribution analyzer. The measured values are shown in Table 1. The formulation of the 2% Ni—Fe alloy is as follows: C (0.4% by mass or more and 0.6% by mass or less), Si (0.35% by mass or less), Mn (0.8% by mass or less), P (0.03% by mass or less), S (0.045% by mass or less), Ni (1.5% by mass or more and 2.5% by mass or less), Cr (0.2% by mass or less), and Fe (remainder).

Then, sintered compacts were obtained in the same manner as in Example 1 except that a binder having a formulation shown in Table 3 was used as the binder. Incidentally, the kneading conditions were set such that the temperature was 160° C. and the time was 30 minutes. Further, the molding conditions were set such that the material temperature was 190° C. Further, the degreasing conditions were set such that the temperature was 600° C., the time was 1 hour, and the atmosphere was nitrogen gas (atmospheric pressure). Further, the firing conditions were set such that the temperature was 1,150° C., the time was 3 hours, and the atmosphere was nitrogen gas (atmospheric pressure).

Comparative Examples 7 to 11

Sintered compacts were obtained in the same manner as in Example 1 except that the powder No. 2 was used as the inorganic powder and a binder having a formulation shown in Table 3 was used as the binder.

TABLE 3

| | Classification | Component | Softening point | Unit | Example 14 | Example 15 | Example 16 | Comparative Example 7 | Comparative Example 8 | Comparative Example 9 | Comparative Example 10 | Comparative Example 11 |
|---|---|---|---|---|---|---|---|---|---|---|---|---|
| Binder | Component A | Tenac HC750 | 170° C. | % by mass | 88 | 87 | | 96 | 92 | | 96.5 | |
| | | Tenac 7520 | 160° C. | % by mass | | | | | | | | |
| | | Tenac 7054 | 165° C. | % by mass | | | 83 | | | | | 72 |
| | Component B | E-GMA-VA | 95° C. | % by mass | 10 | 7 | 9 | | | | 0.5 | |
| | | E-GMA-MA | 52° C. | % by mass | | 2 | | | | | | |
| | | E-GMA | 103° C. | % by mass | | | | | | | | |
| | Wax | Paraffin wax | 60° C. | % by mass | | 1 | 3 | | 5 | 2 | 1 | 2 |
| | | Microcrystalline wax | 70° C. | % by mass | | 0.5 | | | | | | |
| | | Polyethylene wax | 110° C. | % by mass | | | | | | | | |
| | Other | Dibutyl phthalate | — | % by mass | | 0.5 | | | 1 | | | |
| | | Stearic acid | 70° C. | % by mass | 2 | 2 | 5 | 2 | 2 | 3 | 2 | 3 |
| | EVA | | 45° C. | % by mass | | | | | | 40 | | |
| | Polystyrene | | — | % by mass | | | | | | 55 | | |
| | Component B/Component A × 100 | | — | % by mass | 11.4 | 10.3 | 10.8 | — | — | — | 0.5 | 31.9 |
| | Wax/Component B | | — | — | 0.00 | 0.17 | 0.33 | — | — | — | 2.00 | 0.09 |
| | Stearic acid/Component B | | — | — | 0.20 | 0.22 | 0.56 | — | — | — | 4.00 | 0.13 |
| Inorganic powder | Metal powder | | — | — | No. 2 | No. 2 | No. 2 | No. 2 | No. 2 | No. 2 | No. 2 | No. 2 |
| Kneaded material | Viscosity | | — | P | 3100 | 3300 | 4700 | 7700 | 7000 | 6600 | 4900 | 1600 |

TABLE 3-continued

| Classification | Component | Softening point | Unit | Example 14 | Example 15 | Example 16 | Comparative Example 7 | Comparative Example 8 | Comparative Example 9 | Comparative Example 10 | Comparative Example 11 |
|---|---|---|---|---|---|---|---|---|---|---|---|
| Evaluation results of sintered compact | Sintering density | — | — | 98.1 | 98.6 | 97.0 | 95.9 | 96.4 | 94.1 | 95.3 | 94.1 |
| | Appearance | — | — | A | A | B | D | D | D | D | C |
| | Dimensional accuracy | — | — | A | A | B | D | D | D | C | D |

*: E-GMA indicates that an ethylene structure and a glycidyl methacylate structure are contained

*: VA indicates that a vinyl acetate structure is contained, and MA indicates that a methyl acrylate structure is contained.

Examples 17 to 19

First, a Ti alloy powder (powder No. 3) produced by a gas atomization method was prepared. The average particle diameter of the powder was measured using a laser diffraction particle size distribution analyzer. The measured values are shown in Table 1.

Comparative Examples 12 to 16

Sintered compacts were obtained in the same manner as in Example 1 except that the powder No. 3 was used as the inorganic powder and a binder having a formulation shown in Table 4 was used as the binder.

TABLE 4

| Classification | | Component | Softening point | Unit | Example 17 | Example 18 | Example 19 | Comparative Example 12 | Comparative Example 13 | Comparative Example 14 | Comparative Example 15 | Comparative Example 16 |
|---|---|---|---|---|---|---|---|---|---|---|---|---|
| Binder | Component A | Tenac HC750 | 170° C. | % by mass | 88 | 87 | | 98 | 92 | | 96.5 | |
| | | Tenac 7520 | 160° C. | % by mass | | | | | | | | |
| | | Tenac 7054 | 165° C. | % by mass | | | 89 | | | | | 72 |
| | Component B | E-GMA-VA | 95° C. | % by mass | 10 | 8 | 7 | | | | 0.5 | |
| | | E-GMA-MA | 52° C. | % by mass | | | | | | | | |
| | | E-GMA | 103° C. | % by mass | | 2 | | | | | | |
| | Wax | Paraffin wax | 60° C. | % by mass | | 1 | | | 5 | 2 | 1 | 2 |
| | | Microcrystalline wax | 70° C. | % by mass | | 0.5 | 3 | | | | | |
| | | Polyethylene wax | 110° C. | % by mass | | | | | | | | |
| | Other | Dibutyl phthalate | — | % by mass | | 0.5 | | | 1 | | | |
| | | Stearic acid | 70° C. | % by mass | 2 | 1 | 1 | 2 | 2 | 3 | 2 | 3 |
| | EVA | | 45° C. | % by mass | | | | | | 40 | | |
| | Polystyrene | | — | % by mass | | | | | | 55 | | |
| | Component B/Component A × 100 | | — | % by mass | 11.4 | 11.5 | 7.9 | — | — | — | 0.5 | 31.9 |
| | Wax/Component B | | — | — | 0.00 | 0.15 | 0.43 | — | — | — | 2.00 | 0.09 |
| | Stearic acid/Component B | | — | — | 0.20 | 0.10 | 0.14 | — | — | — | 4.00 | 0.13 |
| Inorganic powder | Metal powder | | — | — | No. 3 | No. 3 | No. 3 | No. 3 | No. 3 | No. 3 | No. 3 | No. 3 |
| Kneaded material | Viscosity | | — | P | 3200 | 3500 | 4800 | 7400 | 7200 | 6700 | 5100 | 6500 |
| Evaluation results of sintered compact | Sintering density | | — | — | 97.8 | 98.3 | 97.2 | 95.6 | 96.1 | 93.8 | 95.8 | 94.2 |
| | Appearance | | — | — | A | A | B | D | D | D | D | C |
| | Dimensional accuracy | | — | — | A | A | B | D | D | D | C | D |

*: E-GMA indicates that an ethylene structure and a glycidyl methacylate structure are contained.

*: VA indicates that a vinyl acetate structure is contained, and MA indicates that a methyl acrylate structure is contained.

Then, sintered compacts were obtained in the same manner as in Example 1 except that a binder having a formulation shown in Table 4 was used as the binder. Incidentally, the kneading conditions were set such that the temperature was 160° C. and the time was 30 minutes. Further, the molding conditions were set such that the material temperature was 190° C. Further, the degreasing conditions were set such that the temperature was 450° C., the time was 1 hour, and the atmosphere was nitrogen gas (atmospheric pressure). Further, the firing conditions were set such that the temperature was 1,100° C., the time was 3 hours, and the atmosphere was argon gas (reduced pressure: 1.3 kPa).

Examples 20 to 22

First, an alumina powder (powder No. 4) was prepared, and the average particle diameter of the powder was measured using a laser diffraction particle size distribution analyzer. The measured values are shown in Table 1.

Then, sintered compacts were obtained in the same manner as in Example 1 except that a binder having a formulation shown in Table 5 was used as the binder. Incidentally, the kneading conditions were set such that the temperature was 160° C. and the time was 30 minutes. Further, the molding conditions were set such that the material temperature was 190° C. Further, the degreasing conditions were set such that the temperature was 500° C., the time was 2 hours, and the atmosphere was nitrogen gas (atmospheric pressure). Further, the firing conditions were set such that the temperature was 1,600° C., the time was 3 hours, and the atmosphere was air.

Comparative Examples 17 to 21

Sintered compacts were obtained in the same manner as in Example 1 except that the powder No. 4 was used as the inorganic powder and a binder having a formulation shown in Table 5 was used as the binder.

Figure 3A:
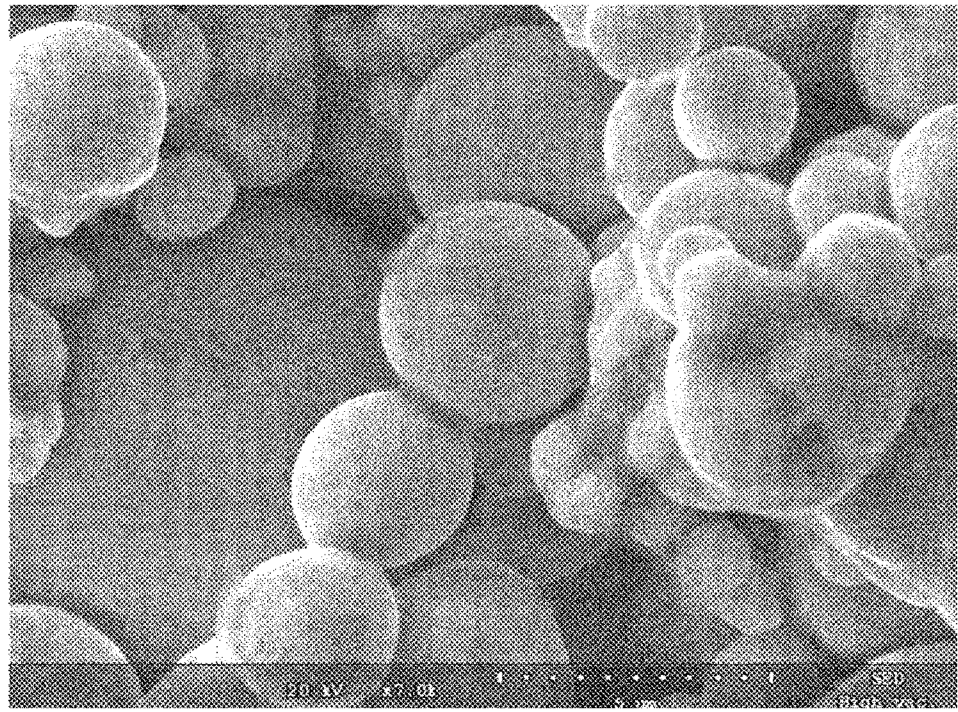
FIGS. 3A and 3B are observed images of compositions for injection molding (kneaded materials) of Example 4 and Comparative Example 2, respectively.

As shown in FIG. 3A, in the case of the kneaded material obtained in Example 4 subjected to the fuming nitric acid treatment, a state in which the inner layer 21 is present so as to connect the inorganic powder particles to one another is observed. Further, it is observed that the surface of a substance which looks like a particle has relatively high smoothness. Accordingly, it is confirmed that the inorganic powder particles shown in FIG. 3A are covered with the inner layer 21 without any uncovered areas.

Figure 3B:
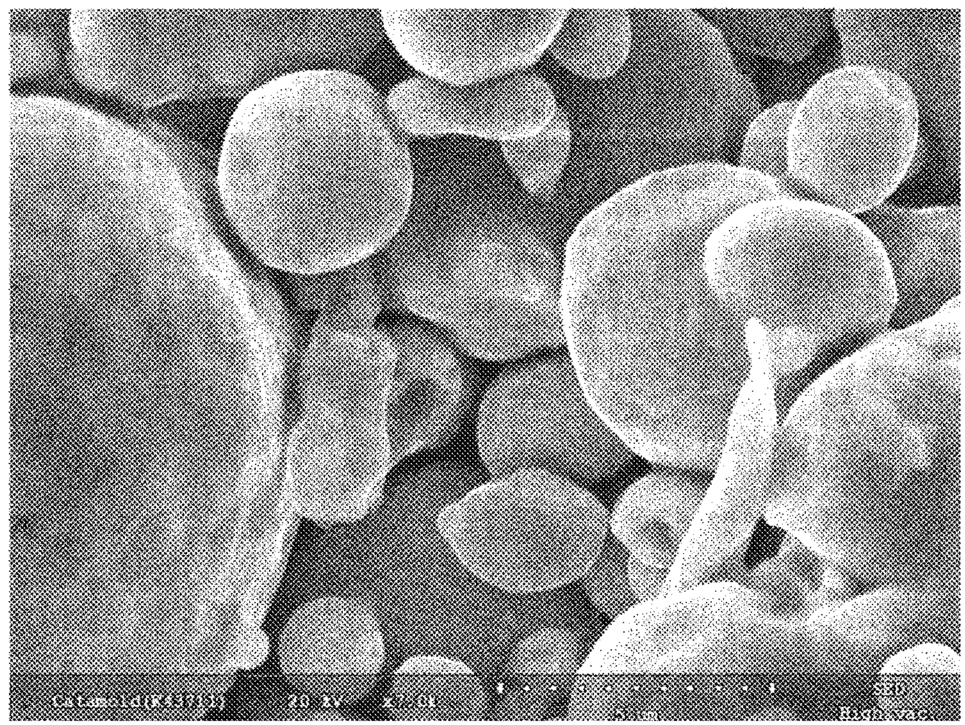

On the other hand, as shown in FIG. 3B, in the case of the kneaded material obtained in Comparative Example 2 subjected to the fuming nitric acid treatment, the inner layer 21 which is present so as to connect the inorganic powder particles to one another is almost not observed. Further, it is observed that on the surface of a substance which looks like a particle, a difference between light and shade is large, and the surface has relatively low smoothness. Accordingly, it is confirmed that on the surfaces of the inorganic powder particles shown in FIG. 3B, even if the inner layer 21 is present, uncovered areas are present.

TABLE 5

| | Classification | Component | Softening point | Unit | Example 20 | Example 21 | Example 22 | Comparative Example 17 | Comparative Example 18 | Comparative Example 19 | Comparative Example 20 | Comparative Example 21 |
|---|---|---|---|---|---|---|---|---|---|---|---|---|
| Binder | Component A | Tenac HC750 | 170° C. | % by mass | 88 | 85 | | 98 | 92 | | 96.5 | |
| | | Tenac 7520 | 160° C. | % by mass | | | | | | | | |
| | | Tenac 7054 | 165° C. | % by mass | | | 85 | | | | | 72 |
| | Component B | E-GMA-VA | 95° C. | % by mass | 10 | 10 | | | | | 0.5 | |
| | | E-GMA-MA | 52° C. | % by mass | | 1 | 3 | | | | | |
| | | E-GMA | 103° C. | % by mass | | | 7 | | | | | 23 |
| | Wax | Paraffin wax | 60° C. | % by mass | | 1 | 2 | | 5 | 2 | 1 | 2 |
| | | Microcrystalline wax | 70° C. | % by mass | | 1 | | | | | | |
| | | Polyethylene wax | 110° C. | % by mass | | 1 | | | | | | |
| | Other | Dibutyl phthalate | — | % by mass | | 0.5 | | | | | | |
| | | Stearic acid | 70° C. | % by mass | 2 | 1.5 | 3 | 2 | 2 | 3 | 2 | 3 |
| | EVA | | 45° C. | % by mass | | | | | | 40 | | |
| | Polystyrene | | — | % by mass | | | | | | 55 | | |
| | Component B/Component A × 100 | | — | % by mass | 11.4 | 12.9 | 11.8 | — | — | — | 0.5 | 31.9 |
| | Wax/Component B | | — | — | 0.00 | 0.18 | 0.20 | — | — | — | 2.00 | 0.09 |
| | Stearic acid/Component B | | — | — | 0.20 | 0.14 | 0.30 | — | — | — | 4.00 | 0.13 |
| Inorganic powder | Ceramic powder | | — | — | No. 4 | No. 4 | No. 4 | No. 4 | No. 4 | No. 4 | No. 4 | No. 4 |
| Kneaded material | Viscosity | | — | P | 3500 | 3700 | 4700 | 7800 | 7600 | 8000 | 7200 | 1300 |
| Evaluation results of sintered compact | Sintering density | | — | — | 97.2 | 97.5 | 96.8 | 93.1 | 93.4 | 92.3 | 93.5 | 93.8 |
| | Appearance | | — | — | A | A | B | D | D | D | D | C |
| | Dimensional accuracy | | — | — | A | A | B | D | D | D | C | D |

*: E-GMA indicates that an ethylene structure and a glycidyl methacylate structure are contained.

*: VA indicates that a vinyl acetate structure is contained, and MA indicates that a methyl acrylate structure is contained.

2. Evaluation of Kneaded Material 2.1 Evaluation of Viscosity of Kneaded Material Each of the kneaded materials obtained in Examples and Comparative Examples was maintained at a temperature of 190° C., and the viscosity thereof was measured using a capirograph. The measurement results are shown in Tables 2 to 5.

2.2 Evaluation by Microscopic Observation

Each of the kneaded materials obtained in Examples and Comparative Examples was placed in fuming nitric acid at 120° C. for 3 hours, whereby the component A was selectively removed from the kneaded material. The polyacetal-based resin as the component A is decomposed at a temperature lower than the softening point in fuming nitric acid, and therefore can be selectively removed. Accordingly, by performing this treatment, the outer layer 22 can be selectively removed from the kneaded material. As a result, in the kneaded material, the inorganic powder and the inner layer 21 mainly remain. Then, the kneaded material subjected to the fuming nitric acid treatment was observed by a scanning electron microscope. In FIGS. 3A and 3B, observed images of the kneaded materials obtained in Example 4 and Comparative Example 2 are shown as representatives, respectively.

Incidentally, a qualitative analysis was performed for the kneaded material obtained in Example 4 subjected to the fuming nitric acid treatment by a Fourier transform infrared spectrophotometer (FT-IR). As a result, a spectrum showing characteristics derived from bonds contained mainly in the component B was obtained.

From the results, it is confirmed that in each Example, the inner layer 21 and the outer layer 22 are reliably formed.

3. Evaluation of Sintered Compact 3.1 Evaluation of Sintering Density

The density of each of the sintered compacts obtained in Examples and Comparative Examples was measured by a method according to the Archimedean method (specified in JIS Z 2501). Further, from the measured sintering density and the true density of the inorganic powder, the relative density of the sintered compact was calculated.

3.2 Evaluation of Appearance

The appearance was evaluated according to the following evaluation criteria by observing 100 sintered compacts obtained in each of Examples and Comparative Examples.

Evaluation Criteria for Appearance

A: The number of sintered compacts in which cracking, chipping, or deformation occurred is 3 or less.

B: The number of sintered compacts in which cracking, chipping, or deformation occurred is 4 or more and 10 or less.

C: The number of sintered compacts in which cracking, chipping, or deformation occurred is 11 or more and 50 or less.

D: The number of sintered compacts in which cracking, chipping, or deformation occurred is 51 or more.

3.3 Evaluation of Dimensional Accuracy

The diameters of 100 sintered compacts obtained in each of Examples and Comparative Examples were measured by a micrometer. Then, for the measured values, evaluation was performed according to the following evaluation criteria based on the "Permissible Deviations in Dimensions Without Tolerance Indication for Widths" specified in JIS B 0411 (Permissible Deviations in Dimensions Without Tolerance Indication for Metallic Sintered Products).

Evaluation Criteria for Dimensional Accuracy

A: Grade is fine (tolerance is ±0.05 mm or less)

B: Grade is medium (tolerance exceeds ±0.05 mm but is ±0.1 mm or less)

C: Grade is coarse (tolerance exceeds ±0.1 mm but is ±0.2 mm or less)

D: Outside the permissible tolerance

The evaluation results of the items 2 and 3 are shown in Tables 2 to 5.

As apparent from Tables 2 to 5, it was confirmed that the respective sintered compacts obtained in Examples have a higher sintering density than the respective sintered compacts obtained in Comparative Examples. Further, it was confirmed that the respective sintered compacts obtained in Examples have superior appearance and dimensional accuracy to the respective sintered compacts obtained in Comparative Examples.

4. Evaluation of Sample for Evaluation 4.1 Production of Sample for Evaluation

First, in order to clarify the relationship between the grinding conditions and the state of the kneaded material, by using a binder powder and an inorganic powder, each of which was ground under the following grinding conditions, a kneaded material as a sample for evaluation was produced. As the inorganic powder and the binder powder, the same powders as in Example 3 were used, and kneading was performed under the same conditions as in Example 3, whereby the kneaded material was obtained.

4.2 Evaluation of Viscosity of Sample for Evaluation

Subsequently, the thus produced sample for evaluation was maintained at a temperature of 190° C., and the viscosity thereof was measured using a capirograph. Then, the viscosity was evaluated according to the following evaluation criteria.

Evaluation Criteria for Viscosity

A: The viscosity is within a range in which both the moldability and the shape retainability can be enhanced.

B: The viscosity is within a range in which the shape retainability is high but the moldability is slightly poor.

C: The viscosity is within a range in which both the moldability and the shape retainability are poor.

4.3 Evaluation of Sample for Evaluation by Microscopic Observation

Subsequently, the thus produced sample for evaluation was subjected to the above-described fuming nitric acid treatment, and the outer layer 22 was selectively removed from each sample for evaluation.

Then, the remainder was observed by a scanning electron microscope, and an observed image was obtained.

Evaluation Criteria for Microscopically Observed Image

A: A lot of necks are observed (necks are present in 70% or more of the interspaces between particulate substances).

B: A few necks are observed (necks are present in 20% or more and less than 70% of the interspaces between particulate substances).

C: Necks are not observed (necks are present in less than 20% of the interspaces between particulate substances).

The evaluation results of the items 4.2 and 4.3 are shown in Table 6. Incidentally, the term "neck" refers to a substance which is present so as to connect particulate substances to each other.

TABLE 6

| | Material temperature when grinding [° C.] | Grinding machine temperature [° C.] | Grinding machine rotation speed [rpm] | Average particle diameter [μm] | Evaluation results of viscosity | Evaluation results of microscopically observed image |
|---|---|---|---|---|---|---|
| Sample 1 | −196 | −20 | 3900 | 67 | B | B |
| Sample 2 | −196 | −15 | 5200 | 53 | A | A |
| Sample 3 | 20 | 22 | 8000 | 55 | C | C |

As apparent from Table 6, it was confirmed that the samples 1 and 2 using a powder obtained by cryogenic grinding as the binder powder each had a viscosity suitable for shape retainability, and also in the samples 1 and 2, an inner layer which covers the inorganic powder particle was formed.

On the other hand, the sample 3 using a powder obtained by grinding at normal temperature as the binder powder had low shape retainability, and when the microscopic observation was performed, an inner layer which covers the inorganic powder particle was not observed.

From the above results, it was confirmed that by using a binder powder obtained by cryogenic grinding and also by optimizing the grinding machine rotation speed and the average particle diameter, a composition for injection molding capable of forming a molded body having higher shape retainability can be produced.

The entire disclosure of Japanese Patent Application No. 2011-262956 filed Nov. 30, 2011 is expressly incorporated by reference herein.

What is claimed is:

1. A composition for injection molding, comprising:

an inorganic powder composed of at least one of a metal material and a ceramic material; and a binder containing a polyacetal-based resin and an ethylene-glycidyl methacrylate-based copolymer, wherein the ethylene-glycidyl methacrylate-based copolymer is contained in an amount of 1% by mass or more and 30% by mass or less with respect to the polyacetal-based resin; and the polyacetal-based resin is a copolymer of formaldehyde and a comonomer other than formaldehyde.

2. The composition for injection molding according to claim 1, wherein the composition has:

an inner layer composed mainly of the ethylene-glycidyl methacrylate-based copolymer and covering each particle of the inorganic powder, and an outer layer composed mainly of the polyacetal-based resin and located outside the inner layer.

3. The composition for injection molding according to claim 1, wherein the ethylene-glycidyl methacrylate-based copolymer contains at least one of vinyl acetate and methyl acrylate as a monomer constituting the copolymer.

4. The composition for injection molding according to claim 1, wherein the softening point of the ethylene-glycidyl methacrylate-based copolymer is 65° C. or higher and 105° C. or lower.

5. The composition for injection molding according to claim 1, further comprising a saturated fatty acid.

6. The composition for injection molding according to claim 1, further comprising a wax.

7. A sintered compact, which is produced using the composition for injection molding according to claim 1.

8. A composition for injection molding, comprising:

an inorganic powder composed of at least one of a metal material and a ceramic material; and a binder containing a polyacetal-based resin and an ethylene-glycidyl methacrylate-based copolymer, wherein the ethylene-glycidyl methacrylate-based copolymer is contained in an amount of 1% by mass or more and 30% by mass or less with respect to the polyacetal-based resin; and wherein the composition has an inner layer composed mainly of the ethylene-glycidyl methacrylate-based copolymer and covering each particle of the inorganic powder, and an outer layer composed mainly of the polyacetal-based resin and located outside the inner layer.

9. The composition for injection molding according to claim 8, wherein the polyacetal-based resin is a copolymer of formaldehyde and a comonomer other than formaldehyde.

10. The composition for injection molding according to claim 8, wherein the ethylene-glycidyl methacrylate-based copolymer contains at least one of vinyl acetate and methyl acrylate as a monomer constituting the copolymer.

11. The composition for injection molding according to claim 8, wherein the softening point of the ethylene-glycidyl methacrylate-based copolymer is 65° C. or higher and 105° C. or lower.

12. The composition for injection molding according to claim 8, further comprising a saturated fatty acid.

13. The composition for injection molding according to claim 8, further comprising a wax.

14. A composition for injection molding, comprising:

an inorganic powder composed of at least one of a metal material and a ceramic material; and a binder containing a polyacetal-based resin and an ethylene-glycidyl methacrylate-based copolymer, wherein the ethylene-glycidyl methacrylate-based copolymer is contained in an amount of 1% by mass or more and 30% by mass or less with respect to the polyacetal-based resin; and wherein the ethylene-glycidyl methacrylate-based copolymer contains at least one of vinyl acetate and methyl acrylate as a monomer constituting the copolymer.

15. The composition for injection molding according to claim 14, wherein the composition has:

an inner layer composed mainly of the ethylene-glycidyl methacrylate-based copolymer and covering each particle of the inorganic powder, and an outer layer composed mainly of the polyacetal-based resin and located outside the inner layer.

16. The composition for injection molding according to claim 14, wherein the polyacetal-based resin is a copolymer of formaldehyde and a comonomer other than formaldehyde.

17. The composition for injection molding according to claim 14, wherein the softening point of the ethylene-glycidyl methacrylate-based copolymer is 65° C. or higher and 105° C. or lower.

18. The composition for injection molding according to claim 14, further comprising a saturated fatty acid.

19. The composition for injection molding according to claim 14, further comprising a wax.

* * * * *